(12) United States Patent
Gravely, III

(10) Patent No.: US 12,389,894 B2
(45) Date of Patent: Aug. 19, 2025

(54) ROTATABLE MOUNTING ASSEMBLY

(71) Applicant: GEM Products, LLC, Jacksonville, FL (US)

(72) Inventor: William Ashford Gravely, III, Jacksonville, FL (US)

(73) Assignee: GEM Products, LLC, Jacksonville, FL (US)

( * ) Notice: Subject to any disclaimer, the term of this patent is extended or adjusted under 35 U.S.C. 154(b) by 641 days.

(21) Appl. No.: 17/846,833

(22) Filed: Jun. 22, 2022

(65) Prior Publication Data
US 2023/0413797 A1 Dec. 28, 2023

(51) Int. Cl.
*A01K 91/08* (2006.01)
*B63B 7/08* (2020.01)

(52) U.S. Cl.
CPC .............. *A01K 91/08* (2013.01); *B63B 7/085* (2013.01)

(58) Field of Classification Search
CPC ....... A01K 91/08; B63B 7/085; F16L 37/252; F16L 27/08; F16L 37/113
See application file for complete search history.

(56) References Cited

U.S. PATENT DOCUMENTS

| | | | | |
|---|---|---|---|---|
| 4,993,346 A | * | 2/1991 | Rupp | A01K 91/08 114/361 |
| 5,855,088 A | * | 1/1999 | Lee | A01K 91/08 43/21.2 |
| 6,766,757 B1 | * | 7/2004 | Tilley | A01K 91/08 43/21.2 |

* cited by examiner

*Primary Examiner* — Anthony D Wiest
(74) *Attorney, Agent, or Firm* — Taft Stettinius & Hollister LLP

(57) ABSTRACT

A mounting assembly for an outrigger. The mounting assembly includes a mounting body adapted to be received by a tube and pivotably couple to a mounting point. The mounting body includes a slotted opening adapted to receive a fastener to restrict axial movement of the mounting body relative to the tube and permit rotational movement of the tube relative to the mounting body.

10 Claims, 11 Drawing Sheets

ROTATABLE MOUNTING ASSEMBLY

TECHNICAL FIELD OF THE INVENTION

The present invention relates generally to a rotatable mounting assembly. More particularly, the present invention relates to a rotatable mounting assembly for an outrigger.

BACKGROUND OF THE INVENTION

Outriggers are popular in fishing applications. Outriggers are rigid poles that are a part of the boats rigging and are designed to extend the fishing pole bait lines beyond the "white wash" of the water surrounding the boat. This is preferable because bait traveling through clear water is more likely to successfully attract and capture fish. Once a fish takes the bait, the line is automatically released from the outrigger and all forces are transferred directly to a fishing pole secured to the gunnel of the boat. For example, the bait line can be connected to a quick release mechanism that releases the line and transfers the forces to the pole when a fish engages the bait or otherwise pulls on the line.

Outriggers typically include several interconnectable or extensible tubes connected to one another by an interconnection device, such as clamps, adhesives, rivets, fasteners, etc. The tubes are supported by one or more supports. These supports are coupled to the hull of the boat or other suitable structure on the boat, such as, for example, pipework or a rigid canopy. As the interconnectable or extensible tubes rotate between the stowed and deployed positions, the supports must also move as well. The range of motion of the supports defines the range of motion of the tubes. Accordingly, appropriate degrees of freedom must be used. If there are not sufficient degrees of freedom of motion at each joint, then the outrigger assembly will not move smoothly. If there are too many degrees of freedom, then the outrigger assembly will not keep a desired position when in use.

Moreover, since boats are made up of many curved surfaces, the mounting points of each support are typically not coplanar or parallel, thereby possibly imparting an undesirable rotational motion onto one or more of the tubes as the outrigger is moved between the deployed and stowed positions, causing possible failure or damage. Conventional outriggers account for this motion using semi-rigid materials that allow for twisting along the tubes and/or use looser fitting hardware and bushings. However, these conventional outriggers see accelerated wear and tear on the assembly. Other conventional outriggers use extremely rigid tubular materials, such as, for example, carbon fiber. Since these rigid tubular materials strongly resist twisting, excessive strain is exerted on the attachment points and hardware causing premature wear and failure of these conventional outriggers.

SUMMARY OF THE INVENTION

The present invention relates broadly to a mounting assembly including a mounting body that is adapted to be received by a tube and pivotably couple to a mounting point disposed on, for example, a boat and/or an outrigger tube. In an embodiment, the mounting body is a clevis that couples to the mounting point via a clevis pin, and the tube is part of an outrigger or outrigger support. The mounting body is adapted to rotate relative to the tube to allow for smooth operation without the need for looser fitting hardware and bushings used in conventional outrigger supports when an outrigger composed of an extremely rigid material, such as, carbon fiber, is moved between deployed and stowed positions.

In an embodiment, the present invention broadly comprises a mounting assembly. The mounting assembly includes a mounting body adapted to be received by a tube and to pivotably couple to a mounting point, where the mounting body includes a slotted opening adapted to receive a fastener to restrict axial movement of the mounting body relative to the tube and permit rotational movement of the tube relative to the mounting body.

In another embodiment, the present invention broadly comprises an outrigger assembly. The outrigger assembly includes a tube including a first opening, a mounting body received by the tube and adapted to pivotably couple to a mounting point, where the mounting body includes a first slotted opening, and a first fastener received by the first opening and the first slotted opening to restrict axial movement of the mounting body relative to the tube and permit rotational movement of the tube relative to the mounting body.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
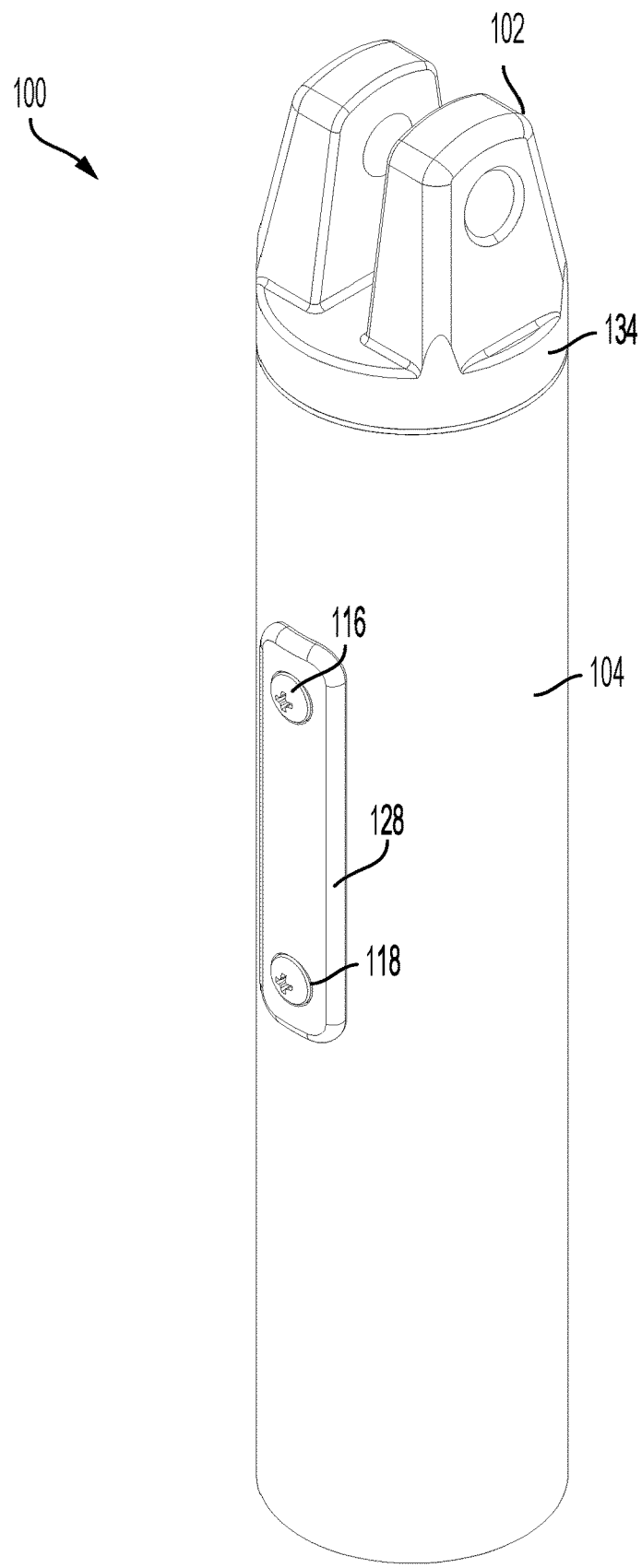
FIG. 1 is a perspective, assembled view of an exemplary mounting assembly, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a mounting assembly including a mounting body that is adapted to be received by a tube and pivotably couple to a mounting point disposed on, for example, a boat and/or an outrigger tube. In an embodiment, the mounting body is a clevis that couples to the mounting point via a clevis pin, and the tube is part of an outrigger or outrigger support. The mounting body is adapted to rotate relative to the tube to allow for smooth operation without the need for looser fitting hardware and bushings used in conventional outrigger supports when an outrigger composed of an extremely rigid material, such as, carbon fiber, is moved between deployed and stowed positions.

Figure 10:
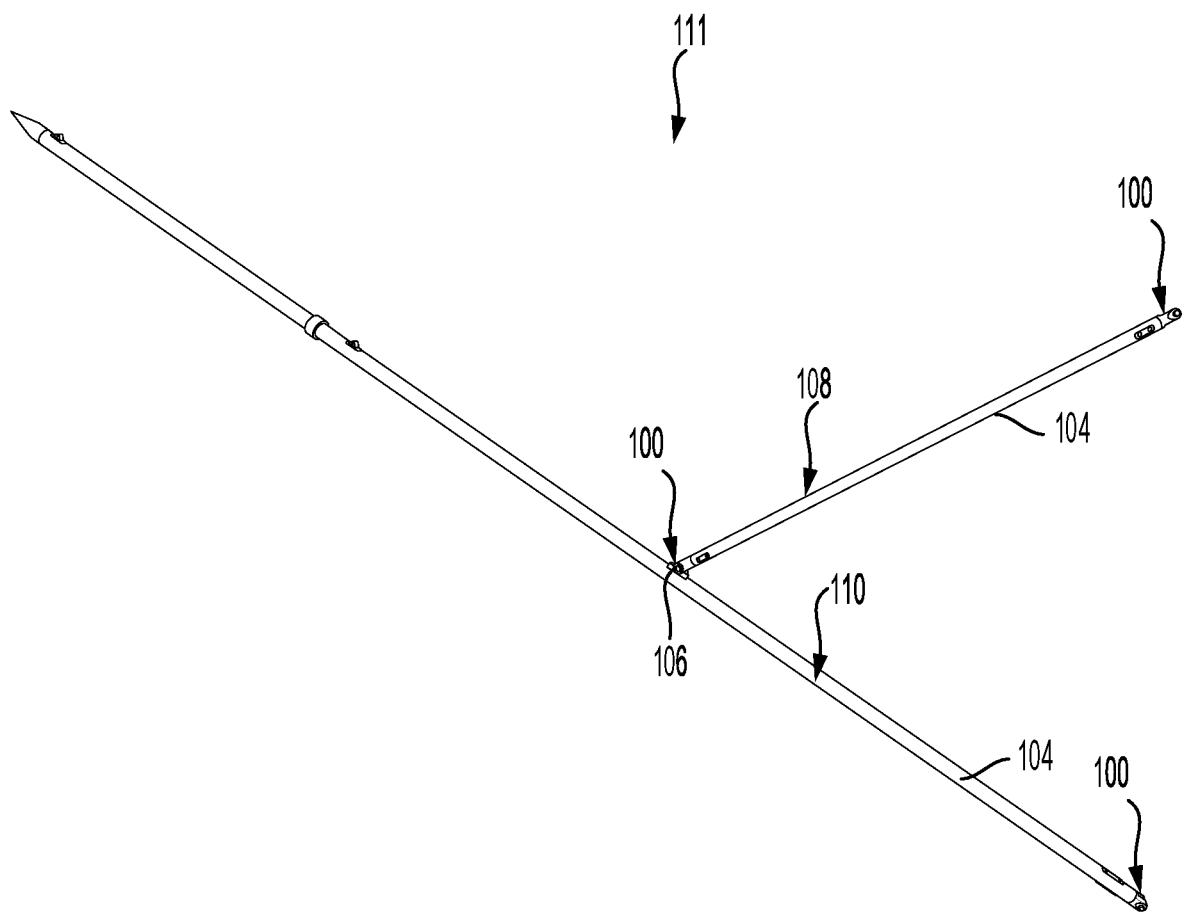
FIG. 10 is a perspective view of the mounting assembly of FIG. 1 in use with an outrigger assembly.
Figure 11:
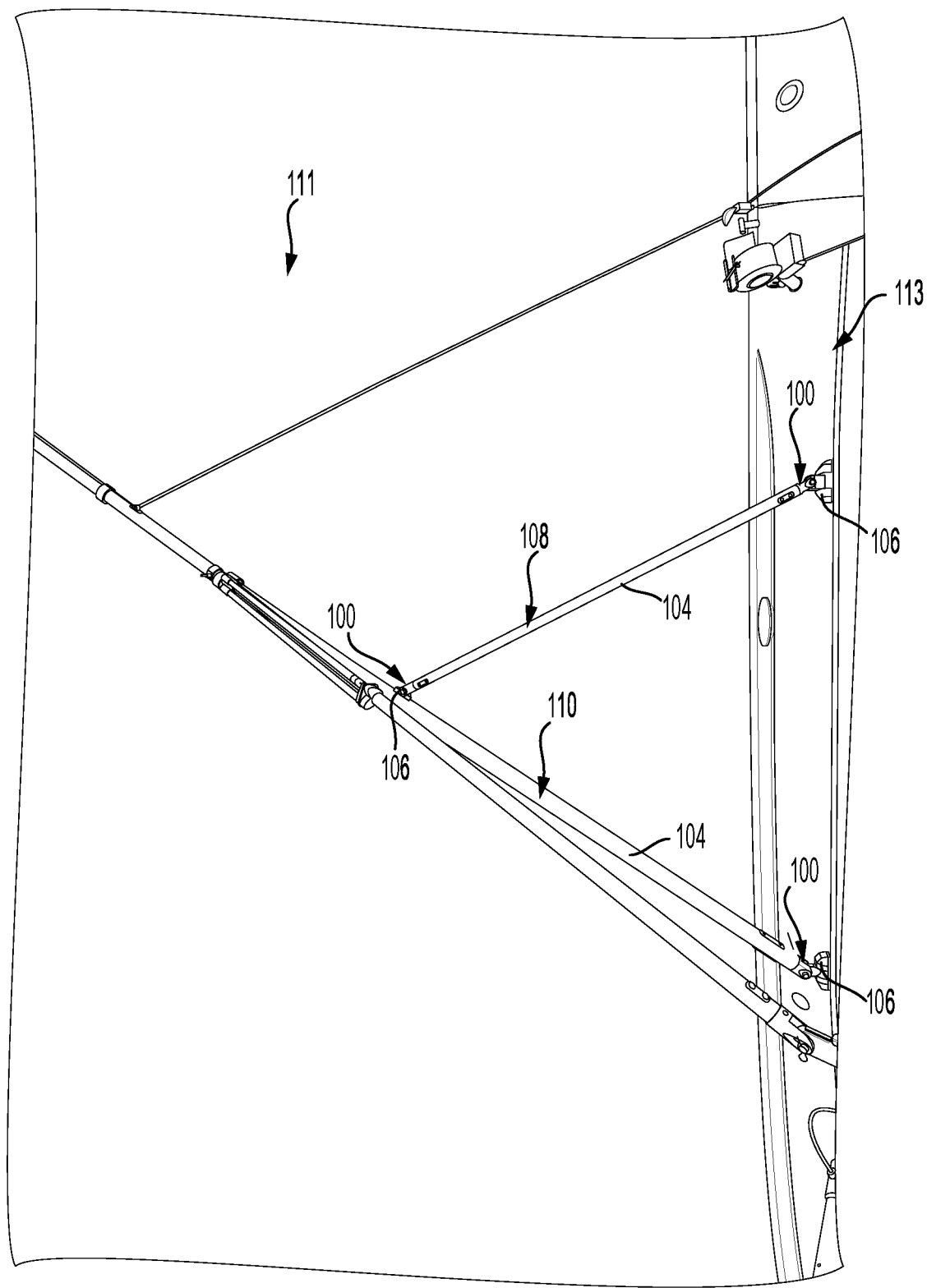
FIG. 11 is a perspective view of the mounting assembly of FIG. 1 in use to mount an outrigger assembly to a boat.

Referring to FIGS. 1-11, a mounting assembly 100, including a mounting body 102 adapted to be received by a tube 104 and pivotably couple to a mounting point 106, is shown. The tube 104 can be part of an outrigger support 108 and/or part of an outrigger tube 110 of an outrigger assembly 111, as illustrated in FIGS. 10 and 11. The mounting point 106 may be disposed on one or more of a vehicle, such as, a hull or other structure, such as pipework and/or canopy, of a boat 113, and/or the outrigger tube 110. As illustrated, the mounting assembly 100 may be disposed on both opposing ends of the outrigger support 108, such that one end is pivotably coupled to the outrigger tube 110 and the other end is pivotably coupled to the vehicle via the mounting points 106.

Figure 5:
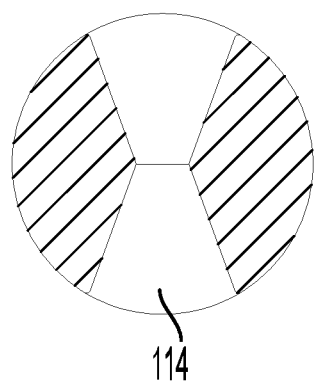
FIG. 5 is a section view of the mounting body of FIG. 1, taken along line 5-5 of FIG. 4.
Figure 6:
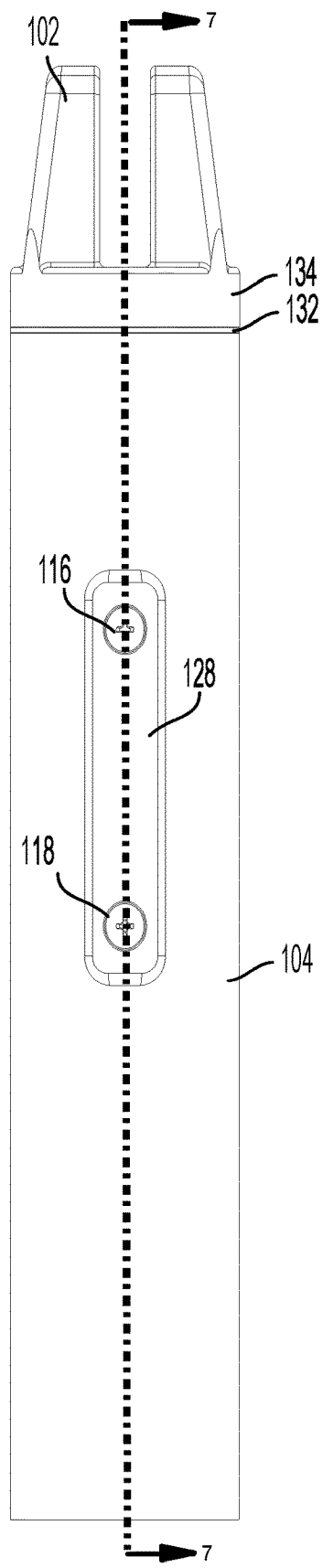
FIG. 6 is a front, assembled view of the mounting assembly of FIG. 1.
Figure 7:
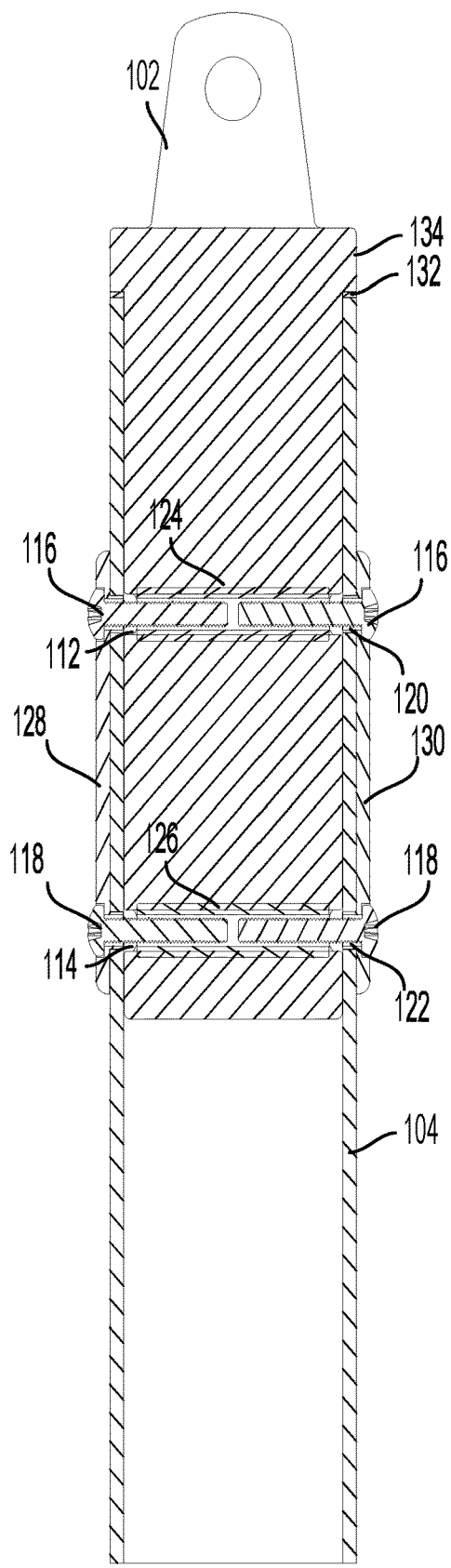
FIG. 7 is a section view of the mounting assembly of FIG. 1 taken along line 7-7 of FIG. 6.
Figure 8:
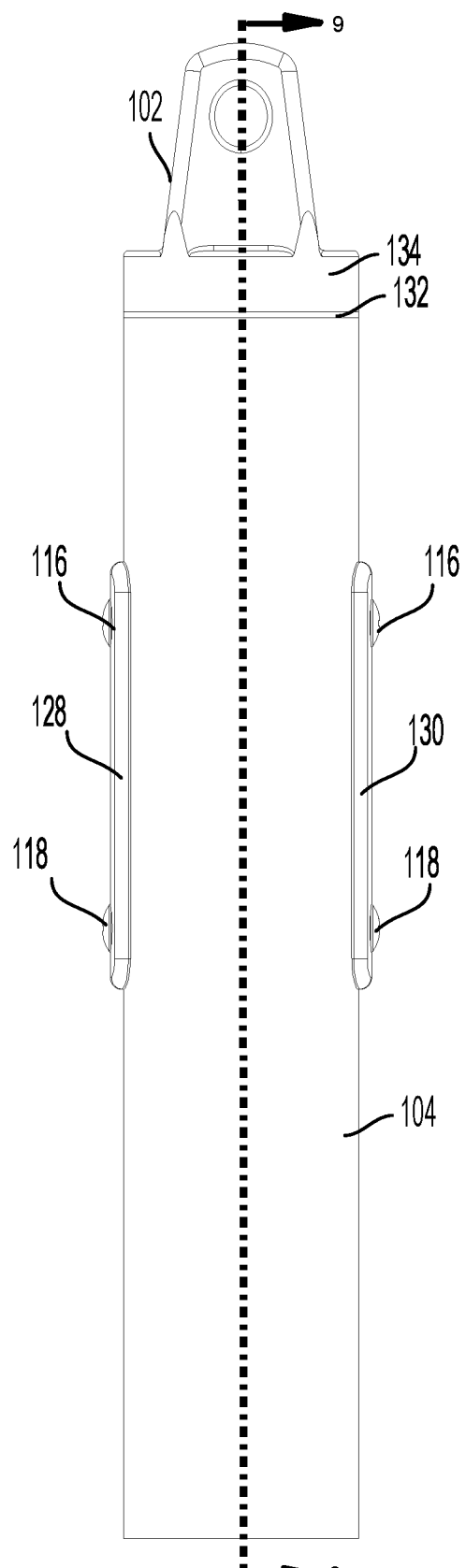
FIG. 8 is a side, assembled view of the mounting assembly of FIG. 1.
Figure 9:
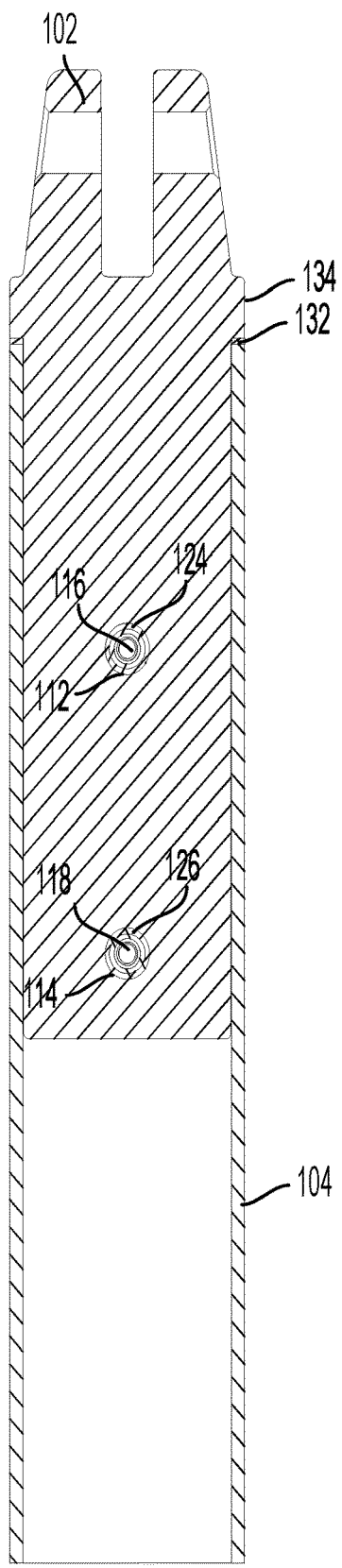
FIG. 9 is a section view of the mounting assembly of FIG. 1, taken along line 9-9 of FIG. 8.

The mounting body 102 includes first 112 and second 114 slotted openings. Although, two slotted openings are shown, the invention is not limited as such, and any suitable number of slotted openings may be used. The first 112 and second 114 slotted openings are respectively adapted to receive first 116 and second 118 fasteners to restrict axial movement of the mounting body 102 relative to the tube 104 while also allowing rotational movement of the tube 104 relative to the mounting body 102. In an embodiment, as best illustrated in FIG. 5, the first 112 and second 114 slotted openings inwardly taper towards a center of the mounting body 102. The first 116 and second 118 fasteners can be threaded fasteners, pins, rivets, etc. In an embodiment, the mounting body 102 is a clevis that is adapted to be pivotably coupled to the mounting point 106 via a clevis pin (not shown) in a well-known manner. However, the mounting body 102 is not limited to being a clevis, and any suitable mounting body capable of pivotably coupling to a mounting point 106 may be used.

The tube 104 includes first 120 and second 122 openings that respectively correspond to the first 112 and second 114 slotted openings. The first 120 and second 122 openings are respectively adapted to receive the first 116 and second 118 fasteners to restrict axial movement of the mounting body 102 relative to the tube 104, while also allowing rotational movement of the tube 104 relative to the mounting body 102. The tube 104 can be part of an outrigger support 108 and/or part of an outrigger tube 110, as illustrated in FIGS. 10 and 11.

Figure 2:
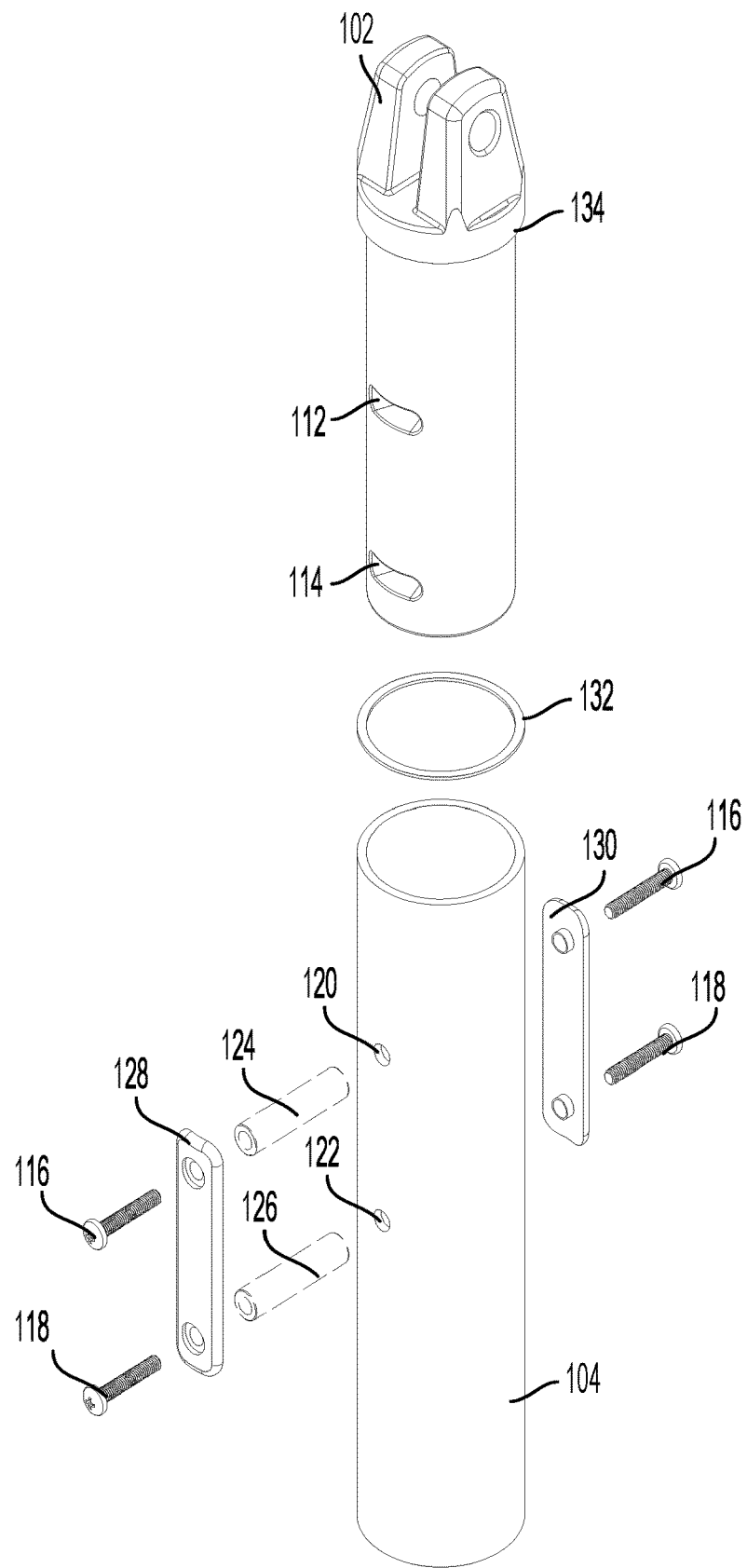
FIG. 2 is a perspective, disassembled view of the mounting assembly of FIG. 1.
Figure 3:
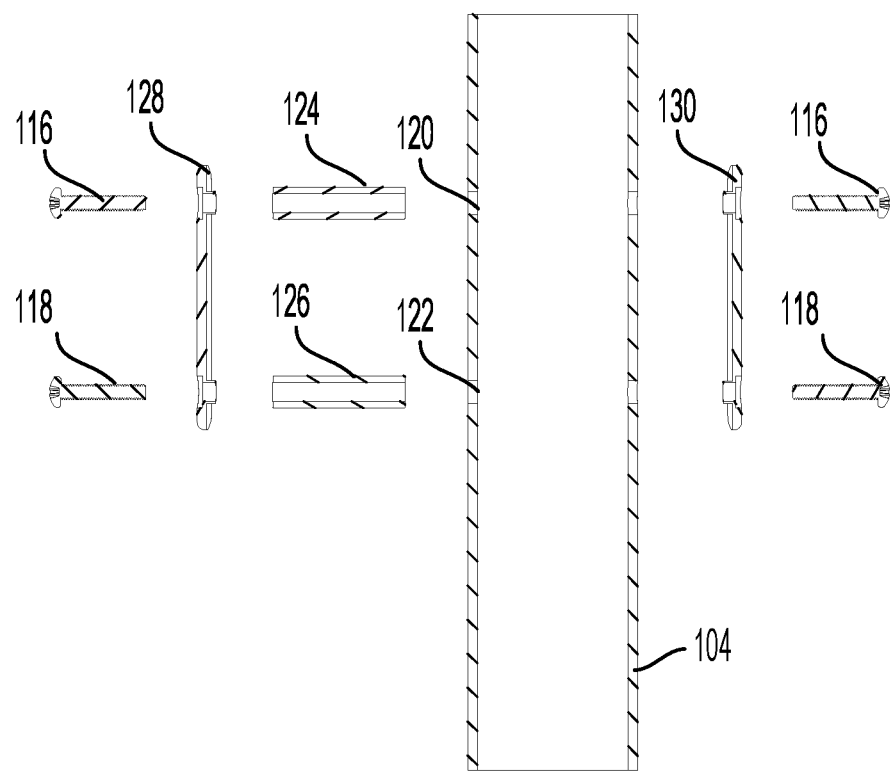
FIG. 3 is a section view of the mounting assembly of FIG. 1, taken along line 7-7 of FIG. 6, in a disassembled condition.
Figure 4:
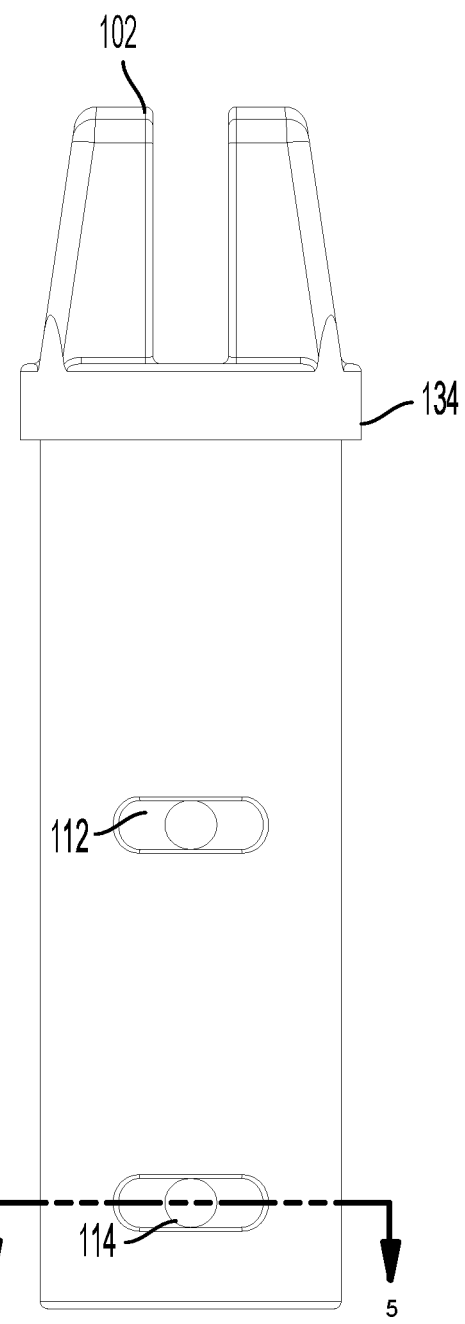
FIG. 4 is front view of the mounting body of FIG. 1.

In an embodiment, first 124 and second 126 coupling nuts are respectively disposed within the first 112 and second 114 slotted openings. The first 124 and second 126 coupling nuts are respectively threadably coupled to the first 116 and second 118 fasteners. In an embodiment, as best illustrated in FIG. 2, the first fastener 116 is a set of two fasteners respectively threadably coupled to opposing ends of the first coupling nut 124, and the second fastener 118 is a set of two fasteners respectively threadably coupled to opposing ends of the second coupling nut 126. In an alternate embodiment, the first 116 and second 118 fasteners respectively extend through the first 112 and second 114 slotted openings and are retained by a retaining structure, such as, for example, a nut or cotter pin. In this embodiment, the first 124 and second 126 coupling nuts would not be required. Although the first 124 and second 126 coupling nuts are illustrated as having round cross-sections, the invention is not limited as such and the first 124 and second 126 coupling nuts can have any suitable cross-sections, such as, for example, hexagonal, square, etc.

In an embodiment, first 128 and second 130 plates are respectively disposed between the first 116 and second 118 fasteners and the tube 104. The first 128 and second 130 plates provide galvanic and abrasive isolation between the first 116 and second 118 fasteners and the tube 104. This isolation is advantageous when the material of the fasteners 116, 118 and the material of the tube 104 have a galvanic potential, such as steel and carbon fiber, where direct contact between the two materials could cause the fasteners 116, 118 to become an anode and thus cause corrosion, especially in a salt water environment. This isolation is also advantageous because it protects the edge of the first 120 and second 122 openings from abrasion by the fasteners 116, 118. The first 128 and second 130 plates also provides protection against over-tightening of the fasteners 116, 118, which could cause degradation or cracking of the tube 104.

In an embodiment, a sleeve 132 is disposed between the tube 104 and an outwardly extending rim 134 of the mounting body 102. The sleeve 132 provides galvanic and abrasive isolation between the mounting body 102 and the tube 104.

During operation, i.e., when the outrigger tube 110 is moved between stowed and deployed positions, the tube 104 is adapted to rotate relative to the mounting body 102 to allow for smooth operation, while also keeping the outrigger tube 110 in a desired position.

As discussed herein, the present invention can be utilized with an outrigger, for example, that includes outrigger and support tubes, to mount the outrigger to a boat. However, the invention is not limited to an outrigger and boats. Any type of tube or rod, such as a fishing rod, shade support rod, or other suitable tube or rod, can be mounted to a suitable surface without departing from the spirit and scope of the present invention.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An outrigger assembly comprising:
   a tube including a first opening;
   a mounting body received by the tube and adapted to pivotably couple to a mounting point, wherein the mounting body includes a first slotted opening that extends through the mounting body and has an hourglass type shape; and a first fastener received by the first opening and the first slotted opening to restrict axial movement of the mounting body relative to the tube and permit rotational movement of the tube relative to the mounting body.

2. The outrigger assembly of claim 1, wherein the tube is part of one of an outrigger tube and an outrigger support.

3. The outrigger assembly of claim 1, further comprising a second fastener, wherein the mounting body includes a second slotted opening and the tube includes a second opening, and wherein second fastener is received by the second slotted opening and the second opening.

4. The outrigger assembly of claim 3, further including first and second coupling nuts respectively disposed in the first and second slotted openings and respectively threadably coupled to the first and second fasteners.

5. The outrigger assembly of claim 4, wherein the first fastener is a set of two fasteners respectively threadably coupled to opposing ends of the first coupling nut, and the second fastener is a set of two fasteners respectively threadably coupled to opposing ends of the second coupling nut.

6. The outrigger assembly of claim 1, further including a first coupling nut disposed in the first slotted opening and threadably coupled to the first fastener.

7. The outrigger assembly of claim 1, further comprising a plate disposed between the first fastener and the tube.

8. The outrigger assembly of claim 1, further comprising a sleeve disposed between the tube and an outwardly extending rim of the mounting body.

9. The outrigger assembly of claim 1, wherein the tube is composed of a carbon-fiber material.

10. The outrigger assembly of claim 1, wherein the mounting body is a clevis.

* * * * *